(12) United States Patent
Haynes

(10) Patent No.: US 10,369,915 B1
(45) Date of Patent: Aug. 6, 2019

(54) PORTABLE BEVERAGE HOLDER

(71) Applicant: Kenneth A. Haynes, Murrells Inlet, SC (US)

(72) Inventor: Kenneth A. Haynes, Murrells Inlet, SC (US)

( * ) Notice: Subject to any disclaimer, the term of this patent is extended or adjusted under 35 U.S.C. 154(b) by 0 days.

(21) Appl. No.: 16/101,892

(22) Filed: Aug. 13, 2018

(51) Int. Cl.
| | |
|---|---|
| *B60N 3/10* | (2006.01) |
| *A47C 7/62* | (2006.01) |
| *A45F 5/00* | (2006.01) |
| *B64D 11/06* | (2006.01) |

(52) U.S. Cl.
CPC ............... *B60N 3/103* (2013.01); *A45F 5/00* (2013.01); *A47C 7/622* (2018.08); *B64D 11/0638* (2014.12); *A45F 2005/006* (2013.01); *A45F 2200/0583* (2013.01)

(58) Field of Classification Search
CPC ..... B60N 3/103; B64D 11/0638; A47C 7/622; A45F 5/00; A45F 2005/006; A45F 2200/0583
USPC ....... 248/311.2, 311.3, 312, 312.1, 313, 322, 248/316.7, 318, 320, 339, 340, 341, 304, 248/231.81
See application file for complete search history.

(56) References Cited

U.S. PATENT DOCUMENTS

| | | | | |
|---|---|---|---|---|
| 1,577,298 | A * | 3/1926 | Roeller ..................... | B62B 9/26 224/409 |
| 1,643,661 | A * | 9/1927 | Kendall ................ | A47J 43/287 211/65 |
| 2,532,244 | A | 11/1950 | Pasmore | |
| 3,269,683 | A * | 8/1966 | Shinaver ................ | F16M 13/02 248/230.5 |
| 4,819,843 | A * | 4/1989 | Nakayama ............. | B60N 3/103 108/44 |
| 5,129,615 | A * | 7/1992 | Strauss ................... | B60R 7/043 206/564 |
| 5,190,257 | A * | 3/1993 | Gradei ..................... | B62J 11/00 248/231.71 |
| 5,249,770 | A * | 10/1993 | Louthan ................... | A47K 1/09 248/205.2 |
| 5,356,107 | A * | 10/1994 | Sinohuiz ................. | A47C 7/62 248/223.41 |

(Continued)

FOREIGN PATENT DOCUMENTS

| | | | | |
|---|---|---|---|---|
| CA | 2263807 | A1 * | 8/2000 | ............. A45C 13/40 |
| FR | 2856901 | A1 * | 1/2005 | ............... A45F 5/02 |
| FR | 2962951 | A1 * | 1/2012 | ............... B60N 3/10 |

*Primary Examiner* — Kimberly T Wood
(74) *Attorney, Agent, or Firm* — Carter, DeLuca & Farrell, LLP

(57) ABSTRACT

A portable beverage holder includes a receptacle, an elongated attachment clip, and first and second fastening tabs. The receptacle includes a body having an open end and a closed end and is configured for receipt of a beverage container. The receptacle further includes a rim surrounding the open end of the body. The elongated attachment clip includes a head defining an opening and first and second legs extending from the head. The head pivotably retains the rim of the receptacle within the opening of the head. The first and second legs extend from the head and are spaced-apart from one another. The free ends of the first and second legs define an opening therebetween enabling insertion of a structure therethrough and into the elongated volume. The fastening tabs extend from the free ends of the respective legs and are configured to releasably engage one another.

11 Claims, 7 Drawing Sheets

(56) References Cited

U.S. PATENT DOCUMENTS

| | | | | |
|---|---|---|---|---|
| 5,473,838 A * | 12/1995 | Denbigh | A01G 27/005 248/104 |
| 5,474,273 A * | 12/1995 | Vinal | A47C 7/68 248/126 |
| 5,484,129 A * | 1/1996 | Megal | A63B 55/408 224/274 |
| 5,489,055 A * | 2/1996 | Levy | B60N 3/103 224/544 |
| 5,639,052 A * | 6/1997 | Sauve | B60N 3/103 224/926 |
| D385,776 S * | 11/1997 | Protz, Jr. | 248/229.26 |
| 5,857,601 A | 1/1999 | Greenwood | |
| 5,992,715 A * | 11/1999 | Habibi | A45F 3/18 222/175 |
| 6,004,033 A * | 12/1999 | Cirone | B62J 11/00 224/901.8 |
| 6,264,153 B1 * | 7/2001 | Ragner | B62J 11/00 224/482 |
| 7,021,825 B1 * | 4/2006 | Schultz | A47D 13/06 224/438 |
| 7,090,175 B1 * | 8/2006 | Ryan, III | F16L 1/11 248/68.1 |
| 7,510,157 B2 * | 3/2009 | Oliver | A45C 13/28 220/739 |
| 7,922,022 B2 * | 4/2011 | Ciarrocchi, Jr. | B65D 25/20 220/23.4 |
| 8,066,148 B2 | 11/2011 | Garahan | |
| 8,235,190 B2 | 8/2012 | Porte et al. | |
| 8,307,966 B2 * | 11/2012 | Cummins | A45F 5/00 190/102 |
| 8,636,319 B1 * | 1/2014 | Parker, Jr. | A47C 7/62 248/311.2 |
| D747,157 S | 1/2016 | Pasho | |
| 2005/0236345 A1 * | 10/2005 | Herbst | A47L 15/503 211/41.9 |
| 2006/0022006 A1 * | 2/2006 | Cruise | A45C 7/0077 224/572 |
| 2006/0037825 A1 * | 2/2006 | Dayton | A45C 13/28 190/110 |
| 2006/0219745 A1 * | 10/2006 | Riley | A45C 13/28 224/400 |
| 2007/0264169 A1 * | 11/2007 | Chen | A61L 9/12 422/124 |
| 2008/0169397 A1 | 7/2008 | Somuah | |
| 2009/0206098 A1 * | 8/2009 | Garahan | A45F 5/02 220/737 |
| 2010/0001028 A1 * | 1/2010 | Titshaw | A45F 3/14 224/251 |
| 2010/0012807 A1 | 1/2010 | Perman | |
| 2010/0051633 A1 * | 3/2010 | Porte | A45C 5/14 220/737 |
| 2010/0078451 A1 * | 4/2010 | Mount | B65D 25/287 224/148.3 |
| 2013/0126686 A1 | 5/2013 | Ballou | |
| 2015/0069197 A1 * | 3/2015 | Mitchell | B60R 11/00 248/221.11 |
| 2015/0265083 A1 * | 9/2015 | Myers | A47G 23/0216 220/739 |
| 2016/0081505 A1 * | 3/2016 | Berg | A47G 23/0225 224/401 |

* cited by examiner

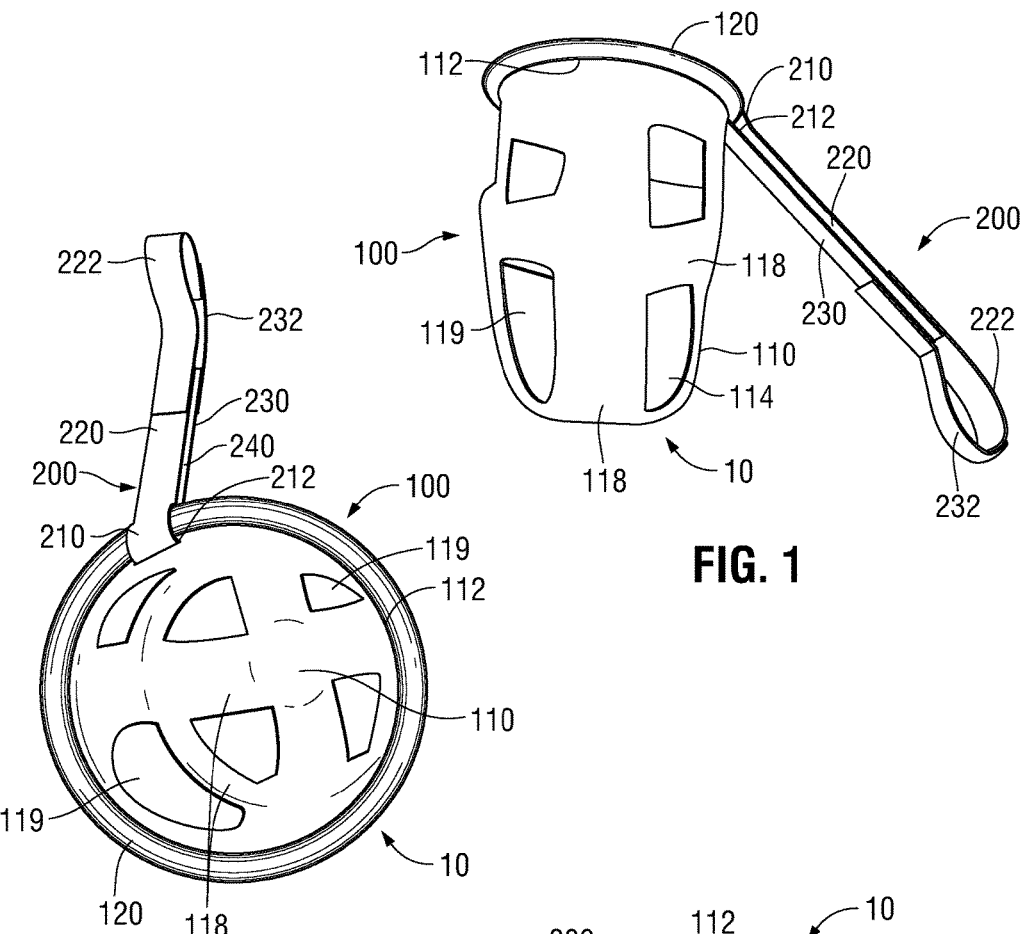
FIG. 1
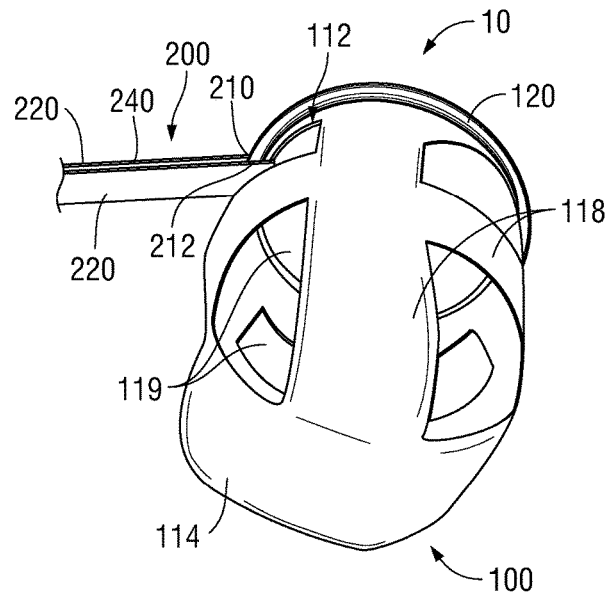
FIG. 2
FIG. 3

PORTABLE BEVERAGE HOLDER

BACKGROUND

Technical Field

The present disclosure relates to beverage holders and, more particularly, to a portable beverage holder configured to retain a beverage (e.g., a bottle, can, cup, etc.) and capable of attachment to and/or support by various different structures, thus facilitating travel with a beverage.

Background of Related Art

Millions of passengers travel each day, whether it be through airports and on airplanes, through train terminals and on trains, and/or via other modes of transportation. Of course, many of these passengers carry luggage with them as they travel. Further still, many passengers transport and consume food and/or drink at some point during their travel.

Portable beverage holders are generally known in the art. However, there is a continuing need for a portable beverage holder that is versatile in enabling attachment to and/or support by various different structures.

SUMMARY

The present disclosure provides a portable beverage holder that is versatile in enabling attachment to and/or support by various different structures. To the extent consistent, any of the aspects and features of the present disclosure detailed herein may be utilized in conjunction with (or without) any of the other aspects and features of the present disclosure.

Provided in accordance with aspects of the present disclosure is a portable beverage holder including a receptacle, an elongated attachment clip, and first and second fastening tabs. The receptacle includes a body having an open end and a closed end. The body defines a generally cylindrical volume configured to receive a beverage container therein. The receptacle further includes a rim surrounding the open end of the body. The elongated attachment clip includes a head defining an opening and first and second legs extending from the head. The head pivotably retains the rim of the receptacle within the opening of the head such that the elongated attachment clip is pivotable relative to the receptacle. The first and second legs extend from the head at fixed ends thereof to free ends thereof and are spaced-apart from one another to define an elongated volume therebetween. The free ends of the first and second legs define an opening therebetween enabling insertion of a structure therethrough and into the elongated volume. The first and second fastening tabs extend from the free ends of the first and second legs, respectively, and are configured to releasably engage one another.

In an aspect of the present disclosure, the elongated volume defined between the first and second legs is disposed in communication with the opening of the head enabling insertion of the rim of the receptacle through the elongated volume and into the opening of the head. Alternatively, in another aspect of the present disclosure, the head of the elongated attachment clip has a C-shaped configuration defining a mouth enabling insertion of the rim of the receptacle through the mouth and into the opening of the head.

In another aspect of the present disclosure, the body of the receptacle is collapsible between a fully extended position and a collapsed position. In other aspects, the body of the receptacle is collapsible between a fully extended position, a partially extended position, and a collapsed position.

In still another aspect of the present disclosure, the first and second fastening tabs are complementary hook and loop fastening components.

In yet another aspect of the present disclosure, the rim of the receptacle defines a thickness greater than a thickness of the body of the receptacle.

In still yet another aspect of the present disclosure, the receptacle is a single, monolithic component. Additionally or alternatively, the elongated attachment clip is a single, monolithic component.

In another aspect of the present disclosure, rim of the receptacle and the opening of the head of the elongated attachment clip define complementary cross-sectional configurations.

In still another aspect of the present disclosure, one or more banners is disposed on the body of the receptacle.

BRIEF DESCRIPTION OF THE DRAWINGS

Various aspects and features of the present disclosure are described hereinbelow with reference to the drawings wherein like numerals designate similar elements in each of the several views and:

FIG. 1 is a perspective view of a portable beverage holder provided in accordance with the present disclosure;

FIG. 2 is a top view of the portable beverage holder of FIG. 1;

FIG. 3 is a bottom perspective view of the portable beverage holder of FIG. 1;

DETAILED DESCRIPTION

Figure 4:
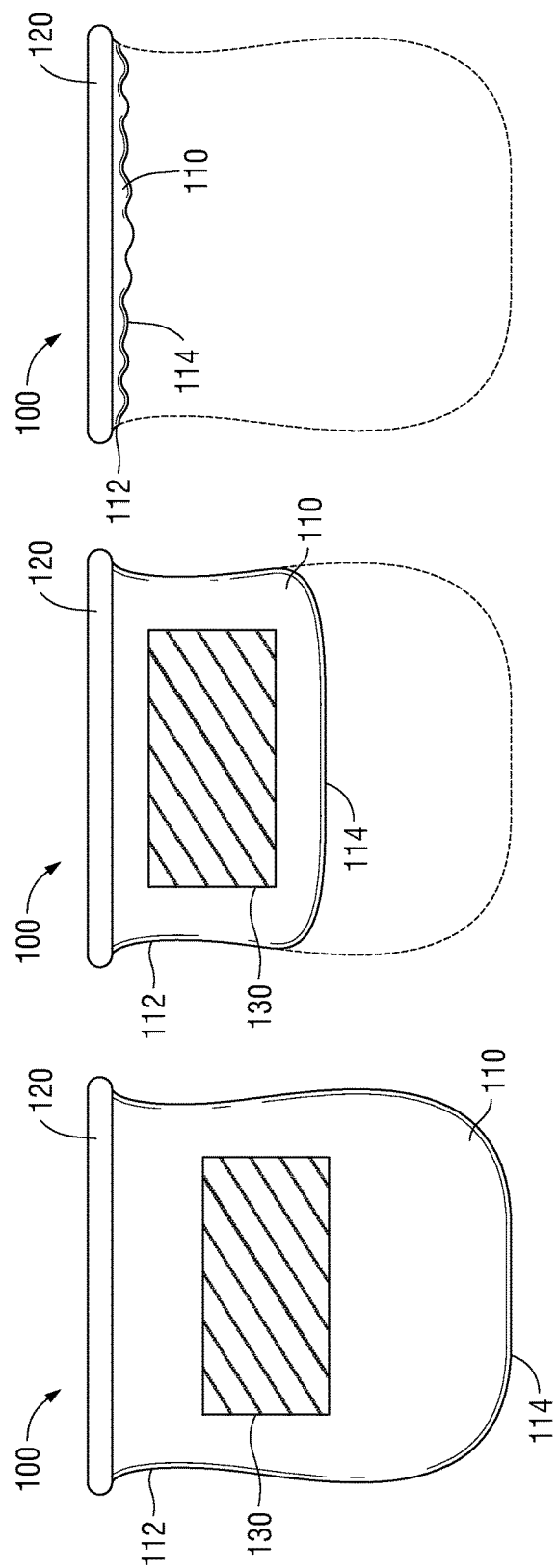
FIGS. 4A-4C are side views illustrating the receptacle of the portable beverage holder of FIG. 1 in fully extended, partially extended, and collapsed configurations, respectively.

Referring to FIGS. 1-3, a portable beverage holder provided in accordance with the present disclosure is shown generally identified by reference numeral 10. Portable beverage holder 10 includes a receptacle 100 and an elongated attachment clip 200. Receptacle 100 is configured to retain a beverage container, e.g., a bottle, can, cup, etc., while elongated attachment clip 200 is pivotably coupled to receptacle 100 to facilitate attachment of elongated attachment clip 200 in a variety of positions to a variety of support structures such as, for example, those detailed below. Receptacle 100 and elongated attachment clip 200 are described in detail, in turn, below.

Continuing with reference to FIGS. 1-3, receptacle 100 is formed from a lightweight and flexible material such as, for example, silicone, rubber, etc. Receptacle 100 includes a body 110 defining an open end 112, a closed end 114, and a generally cylindrical internal beverage-receiving volume 116. A rim 120 of receptacle 110 surrounds open end 112 of body 110 and provides increased structural support and/or stiffness as compared to body 110 to maintain open end 112 of body 110 in an open configuration. As detailed below, rim 120 also enables pivotable attachment of elongated attachment clip 200 to receptacle 100.

Body 110 may be formed from a plurality of spaced-apart strips 118 defining openings 119 therebetween as illustrated in FIGS. 1-3, wherein some strips 118 extend annularly about the perimeter of body 110 and other strips 118 extend longitudinally along body 110 (and about closed end 114 to define closed end 114), with the annular strips 118 and the longitudinal strips 118 crossing one another to define a suitable structure for retaining and supporting a beverage container within volume 116. Alternatively, body 110 may define any other suitable configuration such as, for example, a solid (uninterrupted) configuration, a lattice configuration, a mesh configuration, other configurations, combinations of different configurations, etc. Body 110 may be formed from a single piece of material or may be formed from multiple pieces of material joined to one another in any suitable manner, e.g., adhesives, mechanical fasteners, etc.

Rim 120 may define an increased thickness as compared to body 110 to provide the increased structural support and/or stiffness, or may include a reinforcement attached thereto or included therein. Rim 120 defines a generally circular transverse cross-sectional configuration to enable elongated attachment clip 200 to smoothly pivot relative thereto, as detailed below (see FIGS. 7 and 8).

In embodiments, as illustrated in FIGS. 4A and 4B, one or more banners 130 are disposed on body 110. Banners 130 may include logos, slogans, designs, text, images, identifying information, or any other suitable display. As can be appreciated, banners 130 thus enable portable beverage holder 10 to function as a promotional item, corporate giveaway, and/or to enable users to show their support for groups, teams, organizations, etc.

Referring to FIGS. 4A-4C, body 110 is collapsible between a fully extended position (FIG. 4A), wherein body 110 is capable of receive a relatively large beverage container, a partially extended position (FIG. 4B), wherein body 110 defines a reduced height for holding relatively smaller beverage containers, e.g., cans, tumblers, kid's containers, etc., and collapsed position (FIG. 4C), wherein body 110 is substantially flat against rim 120 to facilitate storage when not in use. The material(s) forming body 110 may enable selective collapsing and retention of body 110 in each of these positions and/or any suitable components, e.g., buckles, snaps, ties, etc., may be provided to enable retention of body 110 in each of the positions.

Figure 5:
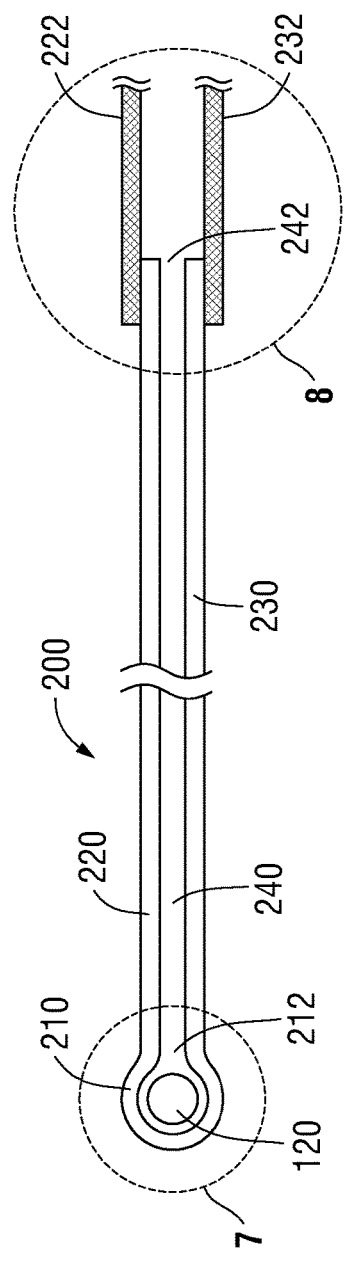
FIG. 5 is a longitudinal, cross-sectional view of the elongated attachment clip of the portable beverage holder of FIG. 1.
Figure 7:
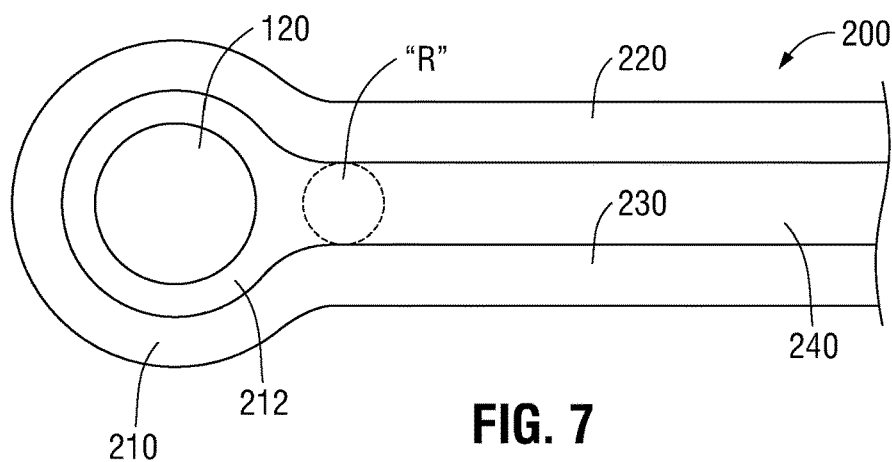
FIG. 7 is an enlarged, longitudinal, cross-sectional view of the area of detail indicated as "7" in FIG. 5.
Figure 8:
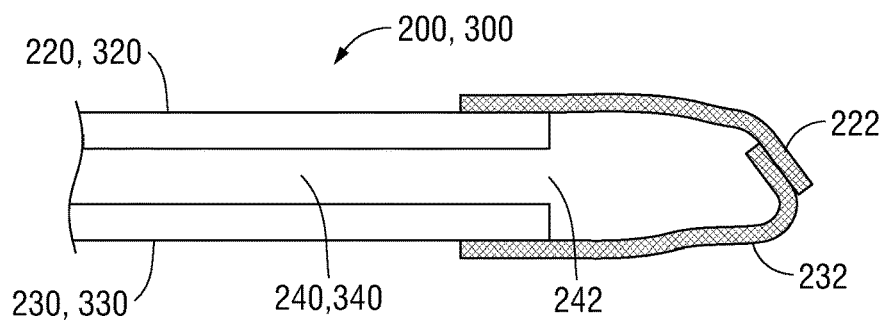
FIG. 8 is an enlarged, longitudinal, cross-sectional view of the area of detail indicated as "8" in FIG. 6.

Turning to FIGS. 5, 7, and 8, elongated attachment clip 200 includes a head 210 and first and second spaced-apart legs 220, 230 extending from head 210. Elongated attachment clip 200 is semi-rigid and formed from any suitable material, e.g., plastic, metal, etc. Elongated attachment clip 200 is semi-rigid in that some flexion thereof is permitted to enable attachment to receptacle 100 and/or a support structure but is otherwise not configured to substantially flex during use.

Legs 220, 230 of elongated attachment clip 200 are attached to one another at head 210 to close the elongated volume 240 defined between spaced-apart legs 220, 230. Legs 220, 230 extend in generally parallel orientation relative to one another to free, second ends thereof wherein legs 220, 230 define an opening 242 therebetween that provides access to the elongated volume 240 between legs 220, 230. Fastening tabs 222, 232, as best illustrated in FIG. 7, are disposed towards the free, second ends of legs 220, 230, respectively, and attached thereto, e.g., via an adhesive. Fastening tabs 222, 232 are configured to releasably engage one another and may define complementary hook-and-loop fastener components, complementary snap-fit components, or other suitable releasable engagement components. Fastening tabs 222, 232, as detailed below, are configured to be looped over components and secured to one another to thereby suspend portable beverage holder 10.

Referring to FIGS. 5 and 8, head 210 defines an opening 212 in communication with elongated volume 240 and configured to receive rim 120 of receptacle 100, e.g., via sliding rim 120 through opening 242 and along elongated volume 240 between legs 220, 230 into opening 212 of head 210. Opening 212 defines a partially-closed circular cross-sectional configuration complementary to the configuration of rim 120 and may have a diameter larger than the distance between legs 220, 230 to enable secure retention of rim 120 of receptacle 100 therein (wherein legs 220, 230 are flexed to receive rim 120 and returned to retain rim 120 within opening 212). With additional reference to FIGS. 1-3, due to this retention of rim 120 and complementary configuration of head 210 and rim 120, relative pivoting between head 210 and rim 120 is permitted such that elongated attachment clip 200 may be pivoted relative to receptacle 100 between a first position wherein elongated attachment clip 200 extends longitudinally along body 110 of receptacle 100 (see, e.g., FIGS. 10-13), and a second position wherein elongated attachment clip 200 extends transversely about the open end 112 of body 110.

Figure 6:
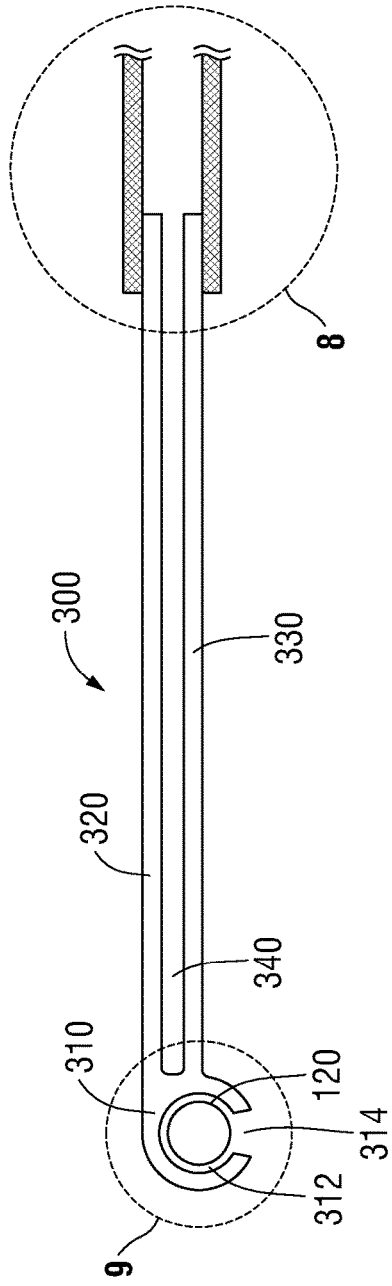
FIG. 6 is a longitudinal, cross-sectional view of another elongated attachment clip configured for use with the portable beverage holder of FIG. 1.
Figure 9:
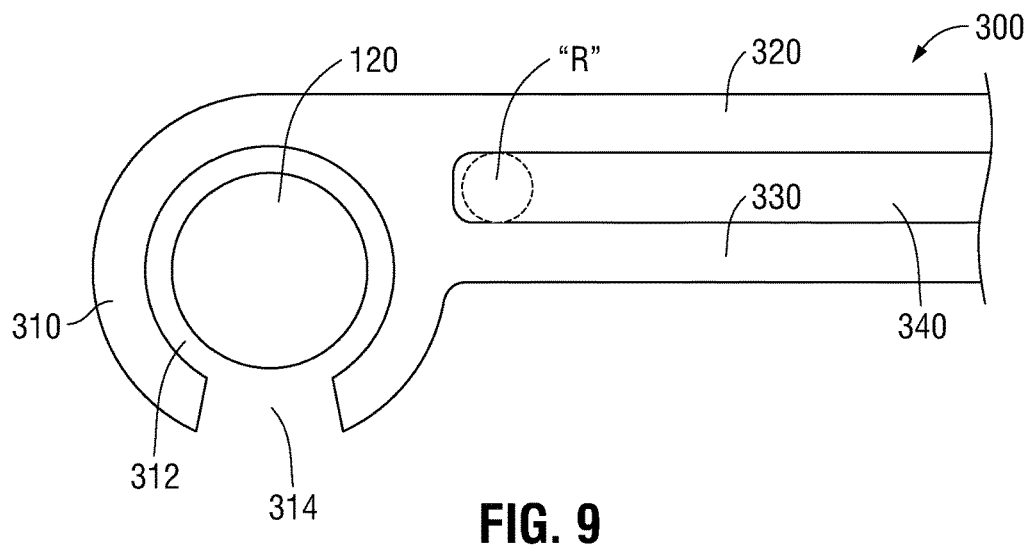
FIG. 9 is an enlarged, longitudinal, cross-sectional view of the areas of detail indicated as "9" in FIGS. 5 and 6.

Momentarily referring to FIGS. 6 and 9, another elongated attachment clip 300 configured for use with receptacle 100 is shown. Elongated attachment clip 300 is similar to elongated attachment clip 200 (FIG. 5), may include any of the features thereof, and may function similarly thereto, except that head 310 thereof is not disposed in communication with the elongated volume 340 defined between legs 320, 330. Rather, head 310 defines a C-shaped configuration defining an opening 312 complementary to the configuration of rim 120, and is semi-rigid allowing flexion to permit passage of rim 120 through mouth 314 of head 310 and into opening 312 thereof. Elongated attachment clip 300 is pivotable relative to body 110 of receptacle 100 similarly as detailed above. Elongated attachment clip 300 may be molded from a plastic, 3D printed, or formed in any other suitable manner from any suitable material(s), as may elongated attachment clip 300 (FIG. 5).

Turning now to FIGS. 10-15, portable beverage holder 10 is shown attached to various different structures. It is understood that these structures are merely exemplary and that portable beverage holder 10 may be attached to any other suitable structure in any of the manners detailed below or in any other suitable manner.

Figure 10:
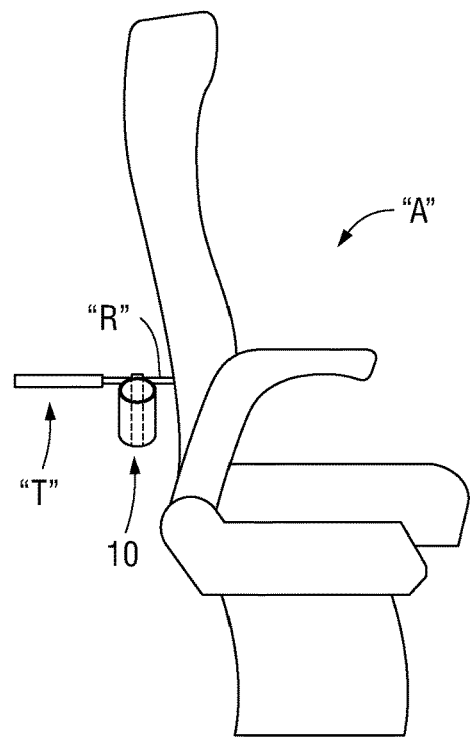
FIG. 10 is a side view illustrating attachment of the portable beverage holder of FIG. 1 to an airplane seat tray table assembly.
Figure 12:
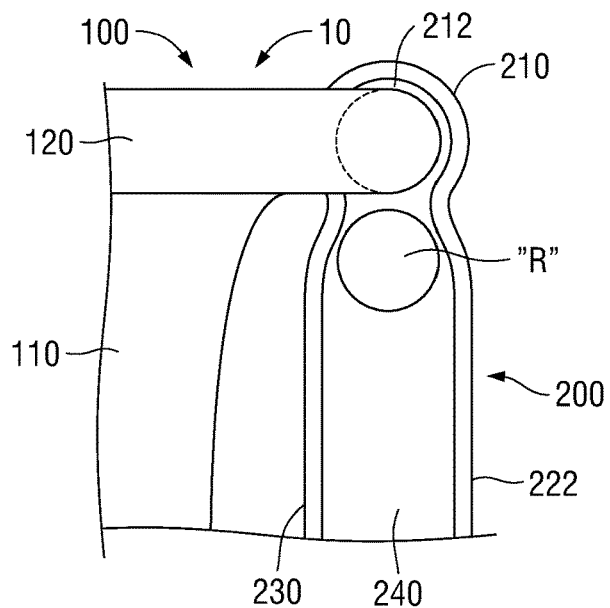
FIG. 12 is an enlarged view illustrating attachment of the portable beverage holder of FIG. 1 to the airplane seat tray table assembly of FIG. 10.

With reference to FIGS. 10 and 12, portable beverage holder 10 is configured to enable ease of attachment with and detachment from, for example, an airplane seat "A." More specifically, elongated attachment clip 200 may be attached to a support structure such as a rail "R" of the tray table assembly "T" of airplane seal "A," for example, via sliding elongated attachment clip 200 such that rail "R" extends through opening 242 (FIG. 5) and along volume 240 between legs 220, 230 and into position adjacent head 210 (and rim 120 of receptacle 100) such that legs 220, 230 straddle rail "R" retaining elongated attachment clip 200 thereabout.

Figure 11:
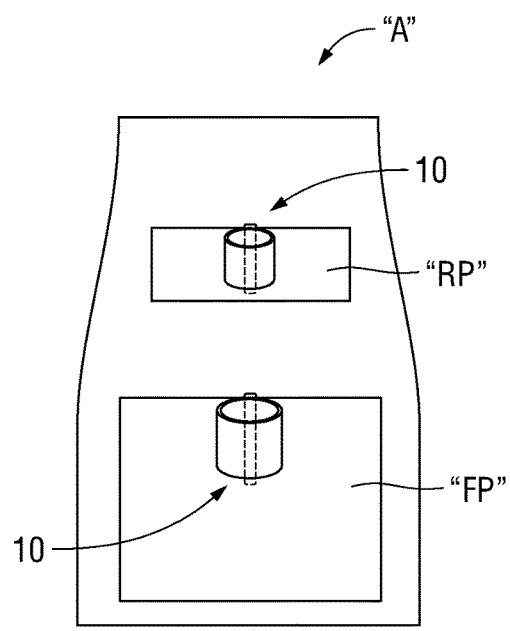
FIG. 11 is a rear view illustrating attachment of the portable beverage holder of FIG. 1 to both flexible and rigid pockets on the back of the airplane seat.
Figure 13:
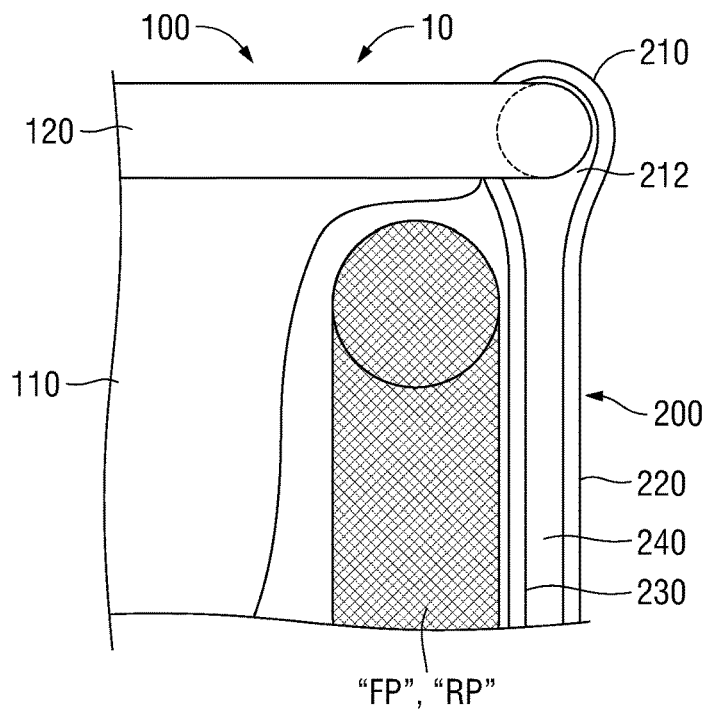
FIG. 13 is an enlarged view illustrating attachment of the portable beverage holder of FIG. 1 to one of the pockets of the airplane seat of FIG. 10.

Referring to FIGS. 11 and 13, elongated attachment clip 200 may be attached to a flexible pocket "FP" and/or a rigid pocket "RP" of airplane seal "A," for example, by slidably inserting both legs 220, 230 of elongated attachment clip 200 into the pocket "FP," "RP" while receptacle 100 remains externally thereof such that receptacle 100 is supported adjacent the pocket "FP," "RP." Alternatively, elongated attachment clip 200 may be attached to the pocket "FP," "RP" similarly as detailed above with respect to rail "R" (FIGS. 10 and 12).

Figure 14:
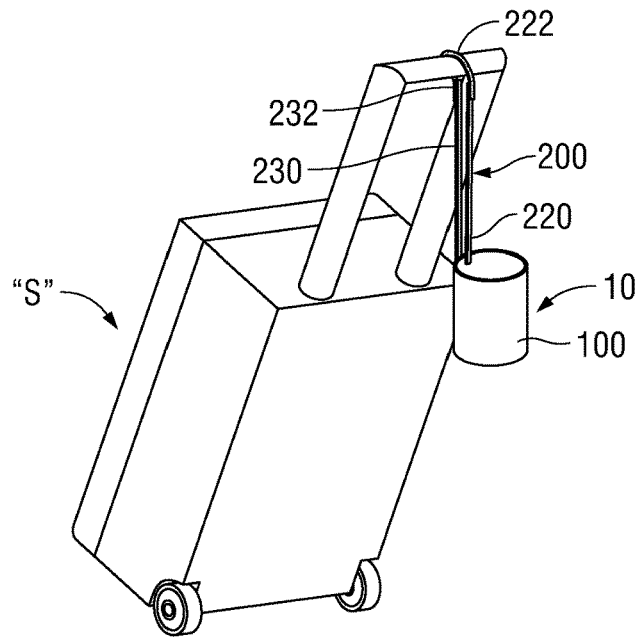
FIG. 14 is a perspective view illustrating the portable beverage holder of FIG. 1 attached to a suitcase.
Figure 15:
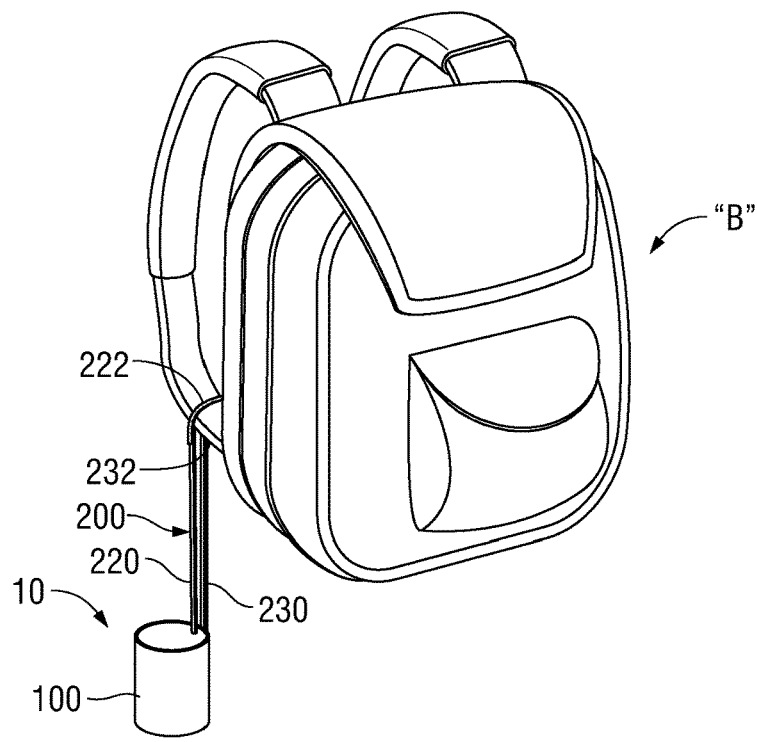
FIG. 15 is a perspective view illustrating the portable beverage holder of FIG. 1 attached to a backpack.

FIGS. 14 and 15 illustrate the ease of attachment of portable beverage holder 10 to and detachment of portable beverage holder 10 from a rolling suitcase "S" and a backpack "B," respectively. Portable beverage holder 10 is attached to rolling suitcase "S" and backpack "B" by looping fastening tabs 222, 232 of legs 220, 230, respectively, around a handle, strap, or other component of the rolling suitcase "S" or backpack "B," and engaging fastening tabs 222, 232 with one another. More specifically, although shown engaged with the extendable handle of suitcase "S," portable beverage holder 10 may alternatively be attached to a side, top, or other fixed handle, movable handle, or suitable structure associated with suitcase "S." Regardless of the particular attachment point and/or apparatus to which portable beverage holder 10 is attached, receptacle 100 hangs down from fastening tabs 222, 232. Receptacle 100 is pivoted relative to elongated attachment clip 200 under gravity to maintain receptacle 100 in an upright position, thereby preventing spillage.

Persons skilled in the art will understand that the features specifically described hereinabove and shown in the accompanying figures are non-limiting exemplary embodiments, and that the description, disclosure, and figures should be construed merely as exemplary of particular embodiments. It is to be understood, therefore, that the present disclosure is not limited to the precise embodiments described, and that various other changes and modifications may be effected by one skilled in the art without departing from the scope or spirit of the disclosure.

What is claimed is:

1. A portable beverage holder, comprising:
   a receptacle including a body having an open end and a closed end and defining a generally cylindrical volume configured to receive a beverage container therein, the receptacle further including a rim surrounding the open end of the body;
   an elongated attachment clip defining a longitudinal axis and including a head defining an opening and first and second legs extending from the head, the first and second legs defining linear configurations and disposed in parallel orientation relative to one another and the longitudinal axis, wherein the head pivotably retains the rim of the receptacle within the opening of the head such that the elongated attachment clip is pivotable relative to the receptacle about a pivot axis that is perpendicular to the longitudinal axis of the elongated attachment clip, and wherein the first and second legs extend from the head at fixed ends thereof to free ends thereof and are spaced-apart from one another to define an elongated volume therebetween that extends along the longitudinal axis, the free ends of the first and second legs defining an opening therebetween enabling longitudinal insertion of a structure therethrough and into the elongated volume; and
   first and second fastening tabs extending from the free ends of the first and second legs, respectively, the first and second fastening tabs configured to releasably engage one another.

2. The portable beverage holder according to claim 1, wherein the elongated volume defined between the first and second legs is disposed in communication with the opening of the head enabling insertion of the rim of the receptacle through the elongated volume and into the opening of the head.

3. The portable beverage holder according to claim 1, wherein the head of the elongated attachment clip has a C-shaped configuration defining a mouth enabling insertion of the rim of the receptacle through the mouth and into the opening of the head.

4. The portable beverage holder according to claim 1, wherein the body of the receptacle is collapsible between a fully extended position and a collapsed position.

5. The portable beverage holder according to claim 1, wherein the body of the receptacle is collapsible between a fully extended position, a partially extended position, and a collapsed position.

6. The portable beverage holder according to claim 1, wherein the first and second fastening tabs are complementary hook and loop fastening components.

7. The portable beverage holder according to claim 1, wherein the rim of the receptacle defines a thickness greater than a thickness of the body of the receptacle.

8. The portable beverage holder according to claim 1, wherein the receptacle is a single, monolithic component.

9. The portable beverage holder according to claim 1, wherein the elongated attachment clip is a single, monolithic component.

10. The portable beverage holder according to claim 1, wherein the rim of the receptacle and the opening of the head of the elongated attachment clip define complementary cross-sectional configurations.

11. The portable beverage holder according to claim 1, further including at least one banner disposed on the body of the receptacle.

\* \* \* \* \*